United States Patent [19]
Das Chaklader et al.

[11] Patent Number: 5,455,212
[45] Date of Patent: Oct. 3, 1995

[54] IN SITU PRODUCTION OF SILICON CARBIDE-CONTAINING CERAMIC COMPOSITE POWDERS

[75] Inventors: Asoke C. Das Chaklader; Edmond C. Y. Lin, both of Vancouver, Canada

[73] Assignee: The University of British Columbia, Canada

[21] Appl. No.: 213,420

[22] Filed: Mar. 15, 1994

[51] Int. Cl.$^6$ .................................................. C04B 35/577
[52] U.S. Cl. ........................... 501/89; 501/91; 501/127; 423/345; 423/625
[58] Field of Search ................................ 501/89, 127, 91, 501/102; 423/345, 625

[56] References Cited

U.S. PATENT DOCUMENTS

| | | |
|---|---|---|
| Re. 32,843 | 1/1989 | Wei . |
| 4,327,066 | 4/1982 | Seimiya . |
| 4,377,563 | 3/1983 | Seimiya . |
| 4,572,844 | 2/1986 | Inoue et al. . |
| 4,591,471 | 5/1986 | Hori . |
| 4,705,762 | 11/1987 | Ota et al. . |
| 4,800,065 | 1/1989 | Christodoulou et al. . |
| 4,895,628 | 1/1990 | Knudsen et al. . |
| 4,916,113 | 4/1990 | Newkirk et al. . |
| 4,921,531 | 5/1990 | Nagle et al. . |
| 5,011,799 | 4/1991 | Das Chaklader et al. . |
| 5,032,242 | 7/1991 | Knudsen et al. . |
| 5,035,921 | 7/1991 | Berneburg et al. . |
| 5,077,243 | 12/1991 | Nakano et al. . |
| 5,096,858 | 3/1992 | Das Chaklader et al. . |
| 5,108,729 | 4/1992 | Gerhold et al. . |
| 5,165,916 | 11/1992 | Cheng et al. . |
| 5,178,847 | 1/1993 | Judin et al. . |
| 5,324,494 | 6/1994 | Glatzmaier ............................. 423/345 |

OTHER PUBLICATIONS

I. Higgins and A. Hendry, "Production of β'-Sialon by Carbothermal Reduction of Kaolinite", *British Ceramic Society Journal*, 85:161–166 (1985).

Asoke C. D. Chaklader, Sankar Das Gupta, Edmond C. Y. Lin, and Boris Gutowski, "Al$_2$O$_3$–SiC Composites from Aluminosilicate Precursors", *Journal of the American Ceramic Society*, 75(8):2283–2285 (Aug. 1992).

F. K. Van Dijen, "Reaction–Rate–Limiting Steps in Carbothermal Reduction Processes", *Journal of the American Ceramic Society*, 68(1):16–19 (Jan. 1985).

Abstract (No. 92–211889) of JP 4,139,014; Toshiba K.K.; May 13, 1992.

Abstract (No. 91–103578) of EP 421313; Inkrott K. E., Cheng P. J.; Apr. 10, 1991.

Abstract (No. 91–097650) of JP 3,040,913; STK Ceramics Kenkyu; Feb. 21, 1991.

Abstract (No. 89–140083) of JP 1,083,510; Ibiden Co. Ltd; Mar. 29, 1989.

Abstract (No. 86–165092) of JP 61,097,126; Mitsubishi Heavy Ind. K.K.; May 15, 1986.

Abstract (No. 86–103736) of JP 61,048,415; Asahi Chemical Ind. K.K.; Mar. 10, 1986.

Abstract (No. 85–161523) of JP 91,072,008; Denki Kagaku Kogyo K.K.; Nov. 15, 1991.

Abstract (No. 83–59883K) of JP 58,079,809; Toyo Soda Mfg. K.K.; May 13, 1983.

Abstract (No. 81–57545D) of JP 56,073,616; Tokyo Shibaura Elec. Ltd.; Jun. 18, 1981.

Abstract (No. CA115(14):141247r) of JP 3,088,709; Canon K.K.; Apr. 15, 1991.

Abstract (No. CA113(12):102340e) of DE 3,939,048; Kemira Oy; May 31, 1990.

Abstract (No. CA110(12):100528m) of WO 8,808,328; Dow Chemical Co.; Nov. 3, 1988.

Abstract (No. CA105(22):196197y) of WO 8,604,524; Dow Chemical Co.; Aug. 14, 1986.

Abstract (No. CA116(22):220249s) of JP 4,002,662; Kishima, Ichitomo; Research Development Corp. of Japan; National Institute for Research in Inorganic Chemicals; Sumitomo Cement Co., Ltd.; Jan. 7, 1992.

Abstract (No. CA103(14):107084c) of JP 60,077,114; Nippon Steel Corp.; Nippon Steel Chemical Co., Ltd.; May 1, 1985.

Abstract (No. CA(102):113368) of JP 59,131,509; Shin–Etsu Chemical Industry Co., Ltd.; Jul. 28, 1984.

Abstract (No. CA98(26):220770q) of JP 57,175,718; Hitachi, Ltd.; Oct. 28, 1982.

Abstract (No. CA95(20:171550v) of JP 56,058,537; Hitachi, Ltd.; May 21, 1981.

Abstract (No. CA117(6):54509a) of JP 4,089,357; Sumitomo Cement K.K.; Mar. 23, 1992.

Abstract (No. CA116(10):87126f) of EP 421,314; Phillips Petroleum Co.; Apr. 10, 1991.

Abstract (No. CA115(24):259346a) of EP 450,593; Phillips Petroleum Co.; Oct. 9, 1991.

Abstract (No. CA115(6):54979n) of JP 2,232,309; Agency of Industrial Sciences and Technology; Sep. 14, 1990.

Abstract (No. CA112(10):80372s) of JP 63,319,045; Sadakata, Masayoshi; Jun. 23, 1987.

Abstract (No. CA111(10):84798n) of EP 313,480; Pechiney Electrometallurgie; Apr. 26, 1989.

Abstract (No. CA111(4):31727g) of JP 1,024,100; Toshiba Ceramics Co., Ltd.; STK Ceramics Kenkyusho K.K.; Jan. 26, 1989.

(List continued on next page.)

*Primary Examiner*—Karl Group
*Attorney, Agent, or Firm*—Baker & Botts

[57] ABSTRACT

A method for producing alumina-silicon carbide ceramic powders by in situ production of silicon carbide particles by introducing a pyrolyzable carbon source, preferably a gaseous hydrocarbon, into a reactor containing an aluminosilicate, pyrolyzing the pyrolyzable carbon source to form carbon particles in situ, wherein the carbon particles are capable of reacting with a silicate in the alumino-silicate to form carbide products, and then reacting the silicate and the carbon particles in situ at an effective temperature, preferably at least 1450° C. and more preferably at least 1500° C., for a sufficient time to transform the alumino-silicate and the pyrolyzable carbon source into the composite ceramic powder having alumina (Al$_2$O$_3$) and silicon carbide (SiC) as major phases.

18 Claims, 1 Drawing Sheet

OTHER PUBLICATIONS

Abstract (No. CA109(24):220182v) of WO 8,804,333; British Petroleum Co. PLC; Jun. 16, 1988.

Abstract (No. CA109(20):172981f) of JP 63,123,435; Toyota Motor Corp.; May 27, 1988.

Abstract (No. CA109(18):152441b) of JP 63,123,436; Toyota Motor Corp.; May 27, 1988.

Abstract (No. CA109(8):57592t) of JP 63,097,225; Nippon Kokan K.K.; Apr. 27, 1988.

Abstract (No. CA106(2):8695h) of EP 199,482; Nippon Steel Corp.; Oct. 29, 1986.

Abstract (No. CA100(18):141625c) of JP 59,013,616; Hori, Fumio; Jan. 24, 1984.

Abstract (No. CA97(14):111943g) of JP 57,061,611; Ryoji, Ueda; Yoshinori, Ando; Apr. 14, 1982.

Abstract (No. CA88(8):54220g) of GB 1,479,727; United Kingdom Atomic Energy Authority; Jul. 13, 1977.

Abstract (No. CA70(22):98387z) of GB 1,134,782; British Titan Products Co., Ltd.; Nov. 27, 1968.

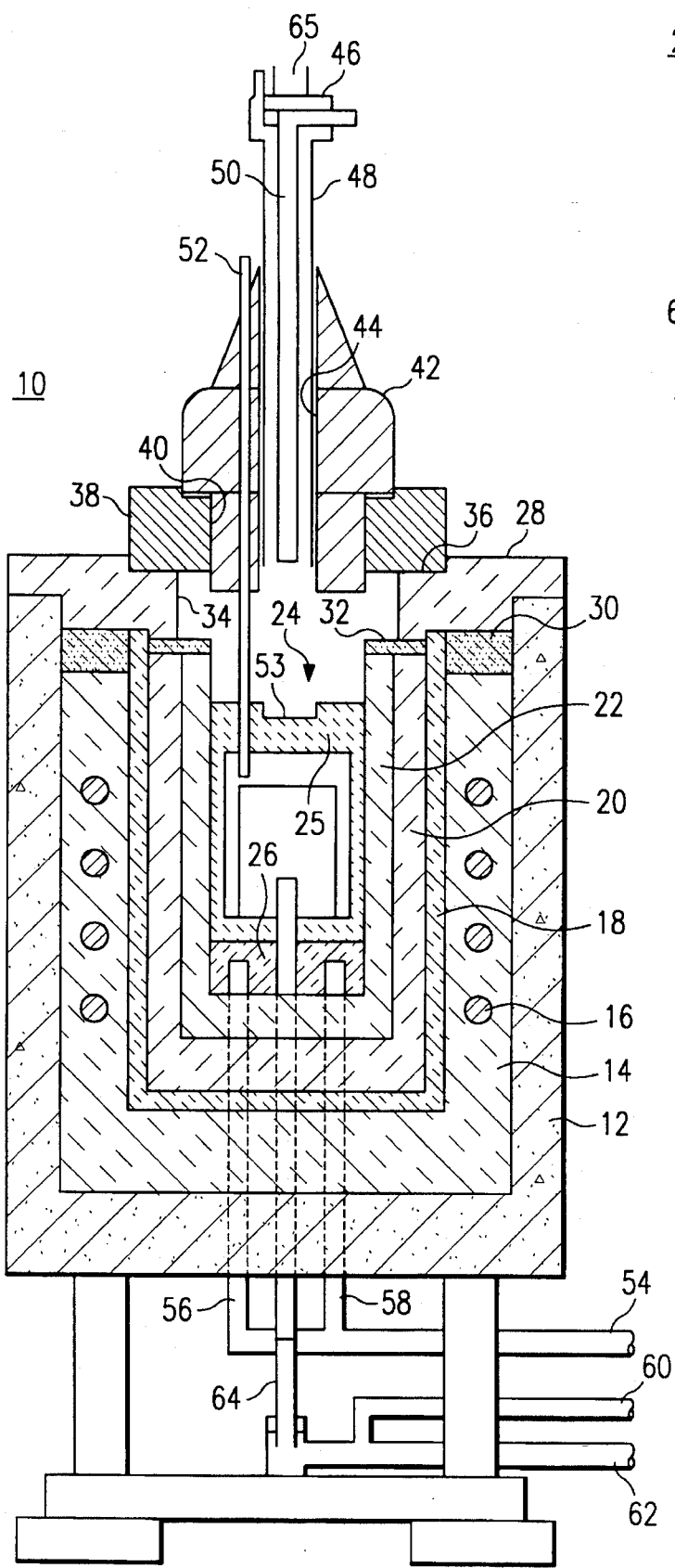
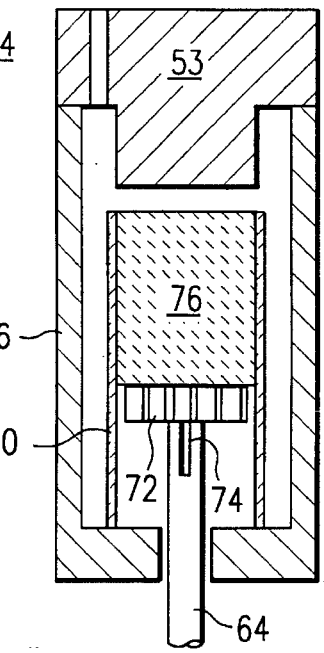
FIG. 1
FIG. 2

IN SITU PRODUCTION OF SILICON CARBIDE-CONTAINING CERAMIC COMPOSITE POWDERS

FIELD OF THE INVENTION

The present invention relates to a method for making ceramic composite powders containing silicon carbide and, more particularly, such composite powders wherein the silicon carbide is produced in situ.

BACKGROUND OF THE INVENTION

Ceramic composites are gaining emphasis in diverse applications such as heat engine components, cutting tools and various wear resistant parts. The ceramic composites typically have improved fracture toughness and improved wear properties. Conventional ceramics are generally monolithic materials and have low fracture toughness. This makes these materials brittle and they are liable to crack under stressed conditions, and are not very useful for diverse demanding industrial applications. Monolithic ceramic materials such as silicon carbide, alumina, silicon nitride and mullite have low fracture toughness ($K_{IC}$) of between 2.5 to 4.5 Mpa$\sqrt{m}$).

There has been extensive research underway to produce ceramic composites of higher fracture toughness, using a matrix such as alumina, silicon nitride and silicon carbide, reinforced by materials such as silicon carbide particles which may be in the form of, for example, whiskers or fibers.

Alumina as a matrix material with silicon carbide whisker reinforcement for ceramic composites has received strong attention. Fracture toughness and strength of alumina-silicon carbide whisker composites ($Al_2O_3$—SiC) are much higher than monolithic alumina. The improved strength and fracture toughness are retained to high temperatures of around 1200° C. The reports on SiC whisker reinforced alumina matrix composites have been so encouraging that the product is already being commercially produced as cutting tools, wear dies and in other applications. Cutting tool materials typically contains around 30% SiC whiskers and show much better resistance to wear and fracture in machining operations. It has even been reported by E. R. Biollman, P. K. Mehrotra et al. Am. Cer. Soc. Bull., 1988, 67, 1016, that the estimated savings in field tests of machining a superalloy is 73% with the $Al_2O_3$—SiC composite tools as compared to machining with just $Al_2O_3$ tools.

Typically these composites (G. C. Wei, U.S. Pat. No. Re. 32,843) are produced by mechanically mixing single crystal SiC whiskers with fine ceramic powders such as alumina ($Al_2O_3$) such that the SiC whiskers are uniformly and homogeneously dispersed. This homogeneous dispersion is normally difficult to achieve through mechanical mixing processes. The mixture is then densified through techniques such as hot pressing at pressures in the range of 28 to 70 MPa and temperatures in the range of about 1600° to 1950° C. with pressing times varying about 0.75 to 2.5 hours.

The commercial way of producing silicon carbide is to pass methane gas or the like through silica ($SiO_2$) in a reducing atmosphere which normally would be formed by the gas that it produces, CO, and reacting the carbon from the methane with silica to reduce it to SiO and then to react SiO with the carbon to form SiC. Various prior art references disclose the conversion of silica ($SiO_2$) in the presence of a hydrocarbon gas (as the carbon source) to SiC. See, U.S. Pat. No. 4,327,066 to Seimiya, U.S. Pat. No. 4,377,563 to Seimiya and JP 91072008 (SiO). Other prior art references disclose the conversion of various silanes, including halosilanes, alkoxysilanes and alkylsilanes, in the presence of a hydrocarbon to SiC. See U.S. Pat. No. 5,165,916 to Cheng et al., U.S. Pat. No. 5,178,847 to Judin et al.( also citing JP 59102809 and *J. Less-Common Metals*, 68(1979), pp.29–41), GB 1,134,782, EP 199482, JP 04089357, JP 57175718, JP 04002662, JP 60077114, JP 59131509 and JP 1083510. SiC also is produced from solid silicon which is vaporized in the presence of a hydrocarbon. See. JP 04139014, JP 61097126, JP 56058537, JP 03088709 and JP 63123436.

There are a number of major problems with the above ceramic composite and process for making same. Each of these methods for producing silicon carbide requires that the resulting silicon carbide then be mixed with a suitable matrix, e.g., alumina, to form the desired ceramic composite powder. Further, the silicon carbide whiskers, in particular, are very expensive as they are made primarily through a VLS process. Recently, however, silicon carbide whiskers are being produced from rice hull, which is a cheap raw material, reducing the cost of whisker production. A further concern relates to the fact that the silicon carbide whiskers are carcinogenic and are very dangerous to handle. This procedure has the attendant deficiencies and difficulties associated with producing a homogeneous mixture of these components. The dispersion of very fine SiC particles, e.g., whiskers, is difficult to achieve and elaborate processing techniques are necessary. With mechanical methods of mixing whiskers and ceramic matrix powders, there is the possibility of whiskers clustering together and whisker damage, and the extent of whisker loading is limited. For example in order to obtain a good dispersibility of whiskers and thus improve the strength of the composite, both ultrasonic dispersion techniques and finer particle, non-agglomerated matrix powder have to be used (P. F. Becher and G. C. Wei, Journal of the American Ceramic Society, 1084, 67,C267). Very elaborate processing techniques, involving flotation or sedimentation from dispersions of the components, were found to be effective in eliminating the potential flaw types (J. Homery, W. L. Vaughn and M. K. Ferber in the American Ceramic Society Bulletin. 1987, 67,333). However, with the information that the SiC whiskers are very carcinogenic, all these complex processing techniques have become very unattractive.

Since it is difficult to produce a uniform dispersion and provide fine particles by a powder mixing method, in situ SiC production is desirable. Along this line, a method utilizing thermal decomposition of organometallic macromolecular substances has been developed. When organometallic macromolecular substances which include metal elements for forming ceramics, such as silicon, are subjected to thermal decomposition in an inert nitrogen-containing atmosphere, organic components are removed and carbides, nitrides, carbonitrides, oxynitrides, etc., and mixtures thereof can be obtained. The organometallic macromolecular substances together with carbon fibers are dispersed in a mullite matrix. The fine ceramic particles produced as a result of the thermal decomposition of such substances form a boundary layer surrounding the grains of mullite and carbon fibers. See U.S. Pat. No. 5,077,243 to Nakano, et al.

In another in situ SiC production scheme, $Al_2O_3$ and SiC composite materials have been produced from mixtures of alumino-silicates and carbon (solid) as precursor materials. These composites are produced by heating a mixture of an alumino-silicate, e.g. kaolinite, and carbon so that only $Al_2O_3$ and SiC remain as major phases. U.S. Pat. No.

5,011,799 and U.S. Pat. No. 5,096,858 to Das Chaklader, et al. and Das Chaklader, et. al., "Al$_2$O$_3$-SiC Composites from Aluminosilicate Precursors," *J. Am. Ceram. Soc.*, Vol. 75, No. 8, pp. 2283–85 (1992). I. Higgins, et al. produced β'-sialon by the carbothermal reduction in a nitrogen atmosphere of kaolinite, which had a carbon source, e.g., carbon black or coal, mixed therein. When argon was substituted for nitrogen, α-Al$_2$O$_3$ and β-SiC were formed instead.

The method of present invention overcomes the difficulties and deficiencies of the prior art which separately produces SiC and then incorporates it into alumina in that the SiC is formed in situ obviating the separate mixing step of the prior art and associated handling concerns relating to the carcinogenic effects of SiC whiskers. Further, the SiC is obtained in situ without any interference from the presence of the alumina component of the alumino-silicate. Though the previous patents and article to Das Chaklader et al. also involve the in situ formation of SiC in an alumino-silicate, a solid source of carbon is used therein and requires that it be homogeneously mixed with the alumino-silicate. In this sense, this method suffers from the same problem of the prior art which separately produced SiC, i.e., a homogeneous mixing step. On the other hand, the present invention utilizes a carbon source which is not normally solid when introduced into the reactor and does not require the prior addition and mixing of solid carbon particles in the aluminosilicates to provide a homogeneous combination of alumina (Al$_2$O$_3$) and silicon carbide (SiC) in the final powder. However, in the present invention, carbon particles having a particular size and shape still may be added into the reactor in order to control the morphology (i.e., the size and shape) of the carbide phase and this would require a mixing step.

Though an in situ production scheme is used by Nakano, the present invention is also distinguishable therefrom in that the methods and starting and ending materials are different. Nakano also requires a homogeneous mixing step. Further, the organometallic macromolecular substances required therein are much more complicated and presumably more difficult and costly to produce or obtain than using a gaseous carbon source, e.g., a hydrocarbon, and an aluminosilicate as in the present invention.

SUMMARY OF THE INVENTION

Accordingly, it is a primary feature and objective of the present invention to provide a process for making ceramic composite powders containing silicon carbide wherein the silicon carbide phase is produced in situ in the ceramic powder matrix.

Broadly, the present invention relates to a process for making alumina-silicon carbide composite ceramic powders comprising introducing at least one pyrolyzable carbon source, preferably a gaseous hydrocarbon, into a reactor containing an alumino-silicate, wherein the alumino-silicate has a silicate component, pyrolyzing the pyrolyzable carbon source to form carbon particles in situ, wherein the carbon particles are capable of reacting with the silicate component to form carbide products, and then reacting the silicate component and the carbon particles so formed in situ at an effective temperature, preferably at least 1450° C. and more preferably at least 1500° C., for a sufficient time to transform the alumino-silicate and the carbon particles formed by pyrolyzing the pyrolyzable carbon source into the composite ceramic powder having alumina and silicon carbide as major phases.

Preferably, prior to introducing the pyrolyzable carbon source into the reactor, the alumino-silicate may be heated to a temperature sufficient to eliminate water (chemically bound and/or adsorbed) contained therein. The temperature is preferably at least 750° C.

The morphology of the silicon carbide formed by the method of the present invention is in the form of whiskers and/or nodules. The morphology of the silicon carbide component may be further controlled by adding to the alumino-silicate a stable solid carbon source, e.g., carbon powders having a desired shape and size and which may be porous. The solid carbon source is homogeneously dispersed within the alumino-silicate prior to introducing the pyrolyzable carbon source.

Silicates of zirconium may also be added to the aluminosilicate prior to contacting with the pyrolyzable carbon source.

The alumino-silicate may be natural or synthetic and may also be raw or calcined. The resulting ceramic composite powder may then be densified, for example, by hot pressing, hot isotactic pressing or sintering to produce a consolidated composite product.

The pyrolyzable carbon source is preferably a $C_1$–$C_9$ hydrocarbon which is gaseous when introduced into the reactor. When pyrolyzed, the pyrolyzable carbon source forms carbon particles and other gaseous components in situ.

Accordingly, these and other objects, features and advantages of the present invention will become apparent to those skilled in the art from a consideration of the following detailed description, wherein reference is made to the figures in the accompanying drawings.

BRIEF DESCRIPTION OF THE DRAWINGS

FIG. 1 is a cross-sectional view of the batch reactor utilized in certain experiments herein.

FIG. 2 is a cross-sectional view of the graphite crucible utilized in the reactor shown in FIG. 1.

DETAILED DESCRIPTION OF THE INVENTION

The invention relates to a method for the production of alumina-silicon carbide composite ceramic powders wherein the silicon carbide (SiC) is produced in situ by utilizing at least one pyrolyzable carbon source which is pyrolyzed to produce carbon particles in situ. The method comprises optionally heating an alumino-silicate to a temperature sufficient to eliminate water contained therein, preferably at least 750° C. The pyrolyzable carbon source is then introduced into a reactor containing the aluminosilicate. The pyrolyzable carbon source is pyrolyzed forming carbon particles in situ, wherein the carbon particles so formed are capable of reacting with a silicate in the aluminosilicate to form carbide products. The silicate and the carbon particles so formed are reacted in situ at an effective temperature, preferably at least 1450° C. and more preferably at least 1500° C., for a sufficient time to transform the aluminosilicate and the in situ formed carbon particles into the composite ceramic powder having Al$_2$O$_3$ and SiC as major phases. The at least one pyrolyzable carbon source is preferably gaseous when introduced into the reactor.

The alumino-silicate may be naturally occurring or synthetic and may be raw or calcined. Suitable alumino-silicates include kaolinitic clays, kyanite, pyrophyllite, mullite and sillimanite. Other clays may also be used but because of impurities in the clays, the final product would naturally contain other phases and impurities. Alkaline alumino-silicates, e.g., monmorillonite, may also be used; however, the initial alkali content is preferably less than 3% by weight thereof. Longer heat treatment times are required to reduce the alkali content, preferably to less than 0.5% by weight thereof and more preferably eliminated, to reduce its effect on high temperature properties of products utilizing such powders. Instead of clays, synthetic alumino-silicates (e.g., alumino-silicates formed by freeze drying, co-precipitation, etc.) may also be used. What is necessary is that the starting material should be a source of final alumina —$Al_2O_3$.

The starting material must also provide a source of silica which normally will come from the alumino-silicates (and zirconium silicates) but may also be provided through added silica.

Another basic precursor is carbon which is necessary for reduction of the silica and to form the silicon carbide (SiC) reinforcing phase. The pyrolyzable carbon source produces carbon in situ in the form of carbon particles when the pyrolyzable carbon source is pyrolyzed. The at least one pyrolyzable carbon source is preferably gaseous when introduced into the reactor, but not necessarily so at normal temperatures. Such pyrolyzable carbon sources suitable herein are preferably a $C_1$-$C_9$ carbon compound such as a hydrocarbon or an alcohol which pyrolyze at temperatures below or at the reaction temperature forming carbon particles in situ. Hydrocarbons presently most preferred include, but are not limited to, natural gas (~96% methane), methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Suitable alcohols include ethanol and propanol. Although such $C_1$-$C_9$ carbon compounds are preferred, any carbon source capable of pyrolyzing to form carbon and other gaseous phase(s) with the carbon so formed capable of reacting with the silicate portion of the alumino-silicate to form carbide products in situ is within the scope of certain aspects of this invention. Accordingly, hydrocarbons, not only those which are in a gaseous state at normal temperatures such as acetylene, methane, etc., but also liquid at normal temperatures such as benzene which can be evaporated and introduced into the reactor by a carrier gas, and which can produce carbon black on pyrolysis can be used.

The alumino-silicate is optionally heated (i.e., calcined) to a temperature of at least 750° C. for the removal of moisture ($H_2O$) present in the hydrated clay minerals such as kaolinite, pyrophyllite, montmorillonite, halloysite, etc. Preheating the alumino-silicates in a very strongly reducing atmosphere such as in CO and/or $H_2$ at a sufficiently high temperature (above 1200° C.) may also remove some of the impurities such as $Na_2O$, $K_2O$, MgO, etc. normally present in natural minerals. This is especially true if sufficient amounts of carbon are present in the alumino-silicates powders. This carbon phase may be formed by pyrolyzing the pyrolyzable carbon source, e.g., hydrocarbons, added into the system or because of added carbon powder in the precursor mixtures. It should be noted that this firing step to remove impurities is not a necessary step, as during the synthesis of $Al_2O_3$ and SiC, i.e., the reaction step, the reducing atmosphere present in the reaction chamber will automatically remove some of the harmful impurities present in natural minerals.

The pyrolyzable carbon source(s) is then introduced into the reactor containing the alumino-silicate and a reducing or inert atmosphere which does not interfere with the reaction between the carbon from the pyrolyzable carbon source, e.g., hydrocarbon, and the $SiO_2$ and SiO. Inert gases, such as argon and helium, may be used as a carrier gas in a volume ratio with the pyrolyzable carbon source which presents an effective amount thereof based on carbon content to react with the $SiO_2$ to form the SiC in situ. The pyrolyzable carbon source(s) is then pyrolyzed to form carbon particles in situ. The silicate in the alumino-silicate reacts with the so formed carbon particles to form silicon carbide in situ. The inert gas also acts as a diluent and carrier for the CO formed during the reaction. The concentration of CO is reduced to a level which does not interfere with the formation of the SiC by allowing $SiO_2$ to react with C to produce SiO and CO and then allowing SiO to react with C to produce the SiC. In addition, at appropriate concentrations, gaseous CO may also reduce $SiO_2$ to SiO, which then reacts with C from the carbon particles forming SiC. A nitrogen atmosphere is not as desirable since nitrogen also reacts with Si to form $Si_3N_4$ or Sialon and therefore reduces the amount of Si available to form SiC.

The shape and size of the resulting SiC also may be controlled. This may be accomplished, for example, by varying the concentration of the pyrolyzable carbon source, for example, by adjusting the flow rate and/or by varying the relative concentration of the inert carrier and the pyrolyzable carbon source., e.g., hydrocarbon. In this manner, SiC whiskers and/or nodules are formed. However, because of the vapor transport process involved in the formation of SiC precipitates, there is a preponderance for the formation of whiskers of SiC in the system when only gaseous hydrocarbon (i.e., at normal temperatures) is used as the main pyrolyzable carbon source.

Alternatively, if other configurations of the SiC are desired, this may be accomplished, for example, by forming a precursor mixture by incorporating morphologically controlled carbon (both size and shape) powders in the alumino-silicate. The concentration of the carbon powders in the precursor mixture may vary widely, e.g., from a few percent to a large concentration, especially if an accurate morphologically controlled carbide phase(s) is desired. In addition, other carbon-based compounds such as polyacrylonitrile (PAN), rayon or even cotton (which undergoes carbonization without melting) may also be used to control the morphology of the carbide phase, but this type of SiC fibers may not be as flaw-free as when highly graphitized carbon or graphite fibers are used. The carbon powders act as seeds for SiC formation, which grows as a result of the reaction between the $SiO_2$ and the in situ carbon particles formed from pyrolyzing the pyrolyzable carbon source. The carbon of the morphologically controlled carbon powders source is also involved in the formation of SiC. The morphologically controlled carbon powders may be in any desired shape, for example, in the form of hexagonal flakes, (random) particulates or fibers. The size and shape of the carbon powders determines the final size and shape of the silicon carbide material in the resultant composite ceramic powder or composite products formed using same.

1 The simplest stoichiometric mixture to produce the composite powder is:

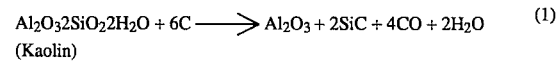

$$Al_2O_3 2SiO_2 2H_2O + 6C \longrightarrow Al_2O_3 + 2SiC + 4CO + 2H_2O \quad (1)$$
(Kaolin)

This combination would produce a composite powder having the two major phases alumina and silicon carbide in the proportion of $Al_2O_3$ (about 56 wt %) and SiC (about 44 wt %) (assuming no SiO loss from the system). The pyrolyzable carbon source would be added such that at least the required amount of carbon content is achieved to allow the reaction to go to completion and convert the silicates present to SiC.

2 If it is desired that the concentration of SiC phase be changed, i.e., increased or decreased, then a mixture of clay, alumina (or a source of alumina), and silica (or a source of silica) plus the carbon from the pyrolyzable carbon source, may be adjusted, for example, as follows:

(i) To decrease the concentration of SiC in the stoichiometric mixture as in #1.

$$Al_2O_3 2SiO_2 2H_2O + Al_2O_{3(x)} + 6C \longrightarrow \quad (2)$$

$$Al_2O_{3(1-x)} + 2\ 2SiC + 4CO + 2H_2O$$

where x=0 to 6

(ii) To increase the concentration of SiC in the stoichiometric mixture as in #1.

$$Al_2O_3 2SiO_2 2H_2O + SiO_{2(y)} + (6+3y)C \longrightarrow \quad (3)$$

$$Al_2O_3 + (2+y)SiC + (4+2y)CO + 2H_2O$$

where y=0 to 6

3 It is also possible to carry out the present invention starting with synthetic alumino-silicate or a mechanical mixture of alumina and silica powders plus the gaseous carbon source. The proportion of alumina, silica and gaseous carbon source will vary depending upon the extent of the SiC phase desired in the composite powders. The stoichiometric reaction for the formation of these composite powders is as follows:

$$(Al_2O_3)_m + (SiO_2)_n + C_p \rightarrow mAl_2O_3 + n\ SiC + 2n\ CO \quad (4)$$

where p=3n; n=1 to 7; m=1 to 4; and m/n=1 to 7

4 To improve on the fracture toughness of the composite products using the $Al_2O_3$—SiC composite powders of the present invention, it may be desirable to add $ZrO_2$ into the system. During the reaction step, zirconium silicate ($ZrSiO_4$) will provide $ZrO_2$ and $SiO_2$ after dissociation and these will then combine with the carbon produced in situ by pyrolyzing the pyrolyzable carbon source and be converted to SiC and ZrC (partially or completely depending on the temperature and time duration of the reaction step), respectively. Thus SiC can be produced from both alumino-silicates and zircon powders.

$$Al_2O_3 2SiO_2 2H_2O + ZrSiO_4 + 9C \rightarrow Al_2O_3 3SiC + ZrO_2 6CO + 2\ H_2O \quad (5)$$

In this situation, the reaction normally results in the formation of ZrC initially in the system, which subsequently can be converted to $ZrO_2$ by a simple heat treatment in the presence of $O_2$ or air. The amount of the zirconia phase in the composite powder can be easily varied by adding different amounts of zircon. The zirconia ($ZrO_2$) formed by the decomposition of the zircon is very finely divided and helps in improving the toughness of the products using such composite powders. Generally, $ZrO_2$ will be present in the composite in the range of 5 to 20 weight percent $ZrO_2$, which requires the zirconium silicate to be present in the raw materials in the amount of about 7.5 to about 30% by weight of the raw material mixture of alumino-silicate and $ZrSiO_4$.

Similarly the composite powders may include TiC in the range of about 5 to 30% by weight in the powder by adding $TiO_2$ to the alumino-silicate.

It is believed that $Ta_2O_5$, $Cr_2O_3$, $WO_3$ or $MoO_3$ could also be incorporated in useful proportions in the precursor mixture to form a composite powder containing carbides of Ta, Cr, W, Mo, etc. in addition to having $Al_2O_3$ and SiC and all these forming in situ.

5 As previously noted, if it is desired that the silicon carbide particles (all or some) in the composite powders should have a certain morphology such as fibers, rods or hexagonal platelets, then morphologically controlled carbon powders in appropriate shaped elements, e.g., in the form of hexagonal platelets or graphite (or carbon) fibers, may be added to the materials described in #1 to #4 above prior to contact with the pyrolyzable carbon source.

It should be noted that the function of carbon from the pyrolyzable carbon source is two-fold in the formation of silicon carbide from $SiO_2$. First, carbon reduces $SiO_2$ into SiO which is a vapor species plus CO. This SiO then reacts with additional carbon from the pyrolyzable carbon source to form SiC and CO.

Thus, in the process of formation of $Al_2O_3$ and SiC from $Al_2O_3 2SiO_2 2H_2O$ (clay), a weight loss of about 45% is encountered. It is desirable then to add two types of carbon to the mixtures, (i) in situ formed carbon from the pyrolyzable carbon source to facilitate the first stage of the reduction reaction and, (ii) morphologically controlled carbon powders, such as graphite flakes or fibers, for the formation of morphologically controlled SiC particles. The carbon powders also will be involved in the reduction of $SiO_2$ to SiO or SiO to SiC.

It is important to note that there would always be some loss of Si from the system as SiO, along with CO. Depending upon the closeness of the reaction vessel (the reactor cannot be an entirely closed system as removal of CO must take place in order that reactions identified in #1 through #5 may proceed) a weight loss (because of loss of SiO) between 3 to 5 wt % or more has been encountered. The rest of the about 45% loss may be due to CO formation and loss and $H_2O$ and impurity elimination. During formulation of the raw materials mix batches, these losses, particularly the loss of silicon as SiO, should be taken into consideration.

For a composite powder also containing zirconia as a toughening agent, a mixture of raw kaolin and zircon (very finely ground) plus the carbon from the pyrolyzable carbon source will produce a mixture of $Al_2O_3$, $ZrO_2$, ZrC and SiC in the system. If it is desired that the level of SiC in the composite should be low, for example at levels of between 10 to 25 wt %, then it will be necessary to adjust the initial formulations such that some $Al_2O_3$ or $ZrO_2$ as a finely divided powder is added to the starting material, e.g., alumino-silicate, such that the final composition will be as desired.

When very high levels of finely divided SiC are present in the ceramic powder, it is difficult to densify the powder without using techniques such as hot pressing.

The alumino-silicates with optionally additional alumina, silica, zircon, zirconia and/or titania thoroughly mixed therewith is then calcined in an inert atmosphere (preferably Ar or He) containing the pyrolyzable carbon source at a temperature of at least 1450° C., and more conveniently at least 1500° C., for the reaction to complete more quickly. This firing step is crucial for the reactions #1 to #5 to take place and almost go to completion forming a final mixture of $Al_2O_3$ and SiC as the major phases for reaction #1 to #4 and a final mixture of $Al_2O_3$, $ZrO_2$, ZrC and SiC as the major phases for reaction #5. Obviously, the temperature must not be so high that the desired end products are decomposed or other undesirable phases are formed.

Depending on the impurities present in the starting materials, e.g., clays, and the time and temperature of firing, the minor phases of the composite powder may include TiC, mullite and carbon. Higher temperatures are desirable to take reaction #1 to completion at a faster rate, and when the only major phases present would be α-$Al_2O_3$ and β-SiC with no mullite phase in the composite powder.

For free flow of starting materials in a powder feeder and in a continuous reactor such as a rotary kiln or a fluidized bed reactor, it may be necessary to granulate the precursor powders before firing.

The reaction sequence in the formation of α-$Al_2O_3$ and β-SiC from clay and the carbon from the pyrolyzable carbon source may be as follows:

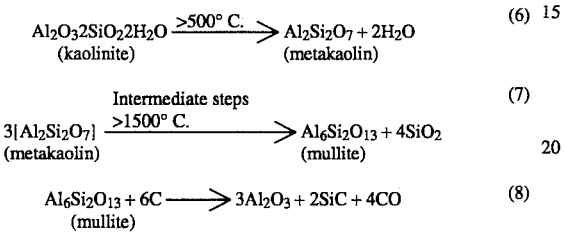

Depending upon the $Al_2O_3$ to $SiO_2$ ratio, an equation equivalent to (8) would apply for a synthetic alumino-silicate and carbon from the pyrolyzable carbon source.

As earlier noted, natural clay materials have impurities such as CaO, MgO, $Na_2O$, $K_2O$, $TiO_2$, $Fe_2O_3$ etc. and it is thought that these impurities would affect the final properties of the composites. The heat treatment during the reaction step that is necessary for the formation of $Al_2O_3$ and SiC from clay minerals also removes CaO (to a smaller extent), $K_2O$, MgO and $Na_2O$ by vaporization because of the presence of strong reducing atmosphere during reactions #1 to #4. Thus, the reactions which produce the major phases $Al_2O_3$ and SiC also eliminates some of the harmful oxides present in raw clay materials. Chemical analysis carried out on the alumina-silicon carbide composites produced by the reaction of kaolinitic clay and the carbon from the pyrolyzable carbon source showed that almost all of alkalies and MgO disappeared from the system by vaporization.

After reacting to form the composite ceramic powder, this powder may be consolidated as desired, for example, to almost full density by hot-pressing and hot-isostatic pressing. Prior to this final step of consolidation however, complex shapes by slip casting, injection molding, etc., can be pre-fabricated before hipping. For simple shapes, such as cylindrical specimens (billets and disks), these can be directly hot-pressed in a graphite die. From these disks, small specimens, e.g., cutting tools, can be prepared by sawing or other techniques.

As earlier noted, further composition modifications of the ceramic composite are possible by adding other pure silicates and oxides, such as Zircon ($ZrSiO_4$), $TiO_2$, etc. These additions will introduce desired phases such as $ZrO_2$, ZrC, TiC, etc. in the composite system, if and when desired.

During the heat treatment and reaction steps, heating may be supplied by direct heating, as opposed to combustion. For example, electrical heating, resistance or induction, may be used. Accordingly, any heating system may be used to heat the reactor, but the precursor powders must be in a reducing and/or neutral environment.

The following examples are given for the purpose of illustrating the present invention without being intended to limit its scope.

EXAMPLES

In order to demonstrate the concept of synthesizing $Al_2O_3$—SiC composites from alumino-silicates and a pyrolyzable carbon source, e.g., a gaseous hydrocarbon, a batch reactor was especially designed and built. An essential feature of the reactor was that it had an inductively heated graphite crucible, which also acted as the sample holder. From a hole at the bottom of the graphite container, an alumina tube was inserted through which the gaseous hydrocarbon was introduced into the powder precursor materials. This is shown in FIG. 1. It had been established during the course of earlier experiments that the gaseous hydrocarbon had to be fed inside the precursor powders and not at the outside or on the top of the powder bed. In the latter cases, only a very small amount of composite powders was formed at the surface of the powder bed.

The above observations clearly indicate that a reactor, in which the carbon formed from the pyrolysis (cracking) of hydrocarbon(s) is preferably homogeneously mixed in situ with the alumino-silicate(s) precursor powder during heating and also at the reaction temperature (preferably at least 1500° C.) to optimize the reaction. From this point of view, it will be desirable for the synthesis of ceramic composites that a rotary kiln and/or a fluidized-bed reactor be used for manufacturing these composite powders.

In the following examples, the reaction vessel 10 shown in FIG. 1 was used. The reaction vessel 10 has a concrete housing 12. Within the concrete housing 12, there is a first liner 14 of alumina insulation. Embedded in the first liner 14 is an induction coil 16. Within the first liner 14, there is a second liner 18 of alumino-silicate insulation. Within the second liner 18, there is a third liner 20 of alumina insulation. Within the third liner 20, there is a fourth liner 22 of magnesium oxide insulation. Within the fourth liner 22, there is a graphite crucible 24 sitting on a bed of alumina insulation 26. The reaction vessel 10 has a lid 28 of alumina. Between the lid 28 and the first liner 14, there is a seal 30 of safil insulation. Between the lid 28 and the third liner 20, there is a seal 32 also of safil insulation. The lid 28 has a first annular hole 34 therethrough and an annular recess 36 concentric with the annular hole 34. A disc 38 of alumino-silicate insulation having a second annular hole 40 is located partly within the annular recess 36. A fitting 42 of magnesium oxide insulation is placed within the second annular hole 40. The fitting 42 has a third annular hole 44 therethrough. Within the third annular hole 44 is fitted a quartz tube 48. The quartz tube 48 has an inner tube 50 which is concentrically positioned. A thermocouple 52 extends through the fitting 42 and through the crucible cap 53 to the interior of the crucible 24. A first tube 54 splits into a second tube 56 and a third tube 58 which in turn penetrate the base of the reaction vessel 10 and extend into the bed of alumina insulation 26 within the reaction vessel 10. A fourth tube 60 and a fifth tube 62 join to form a sixth tube 64 which then penetrates the base of the reaction vessel 10 and extends through the base of the graphite crucible 24 to the interior thereof.

To protect the graphite crucible 24 from oxidation, an inert gas such as argon is passed outside the graphite crucible 24 via the inner tube 50, second tube 56, and third tube 58. The induction coil 16 supplies the heat for the optional heat treatment step and for the reaction step. The fourth tube serves as an inert gas inlet to the interior of the crucible 24 with the fifth tube 62 serving as an inlet for the gaseous carbon source. The alumino-silicate (not shown) is placed within the interior of the graphite crucible 24. The outer tube 48 serves as a gas outlet. A water cooled brass jacket (not shown) was fabricated to hold the quartz window 46 and to prevent gas leakage at the top of the reaction vessel 10. A dual wave length infrared pyrometer 65 was positioned at the top of the reaction vessel 10 to monitor the exterior temperature of the graphite crucible 24.

In FIG. 2, there is shown an enlarged view of the graphite crucible 24. The graphite crucible 24 has a cup portion 66 and the crucible cap 53. Within the crucible 24 is cylinder 70 of alumina concentrically placed within the cup portion 66. The sixth tube 64 extends through the base of the cup portion 66 and is concentrically located within the cylinder 70. A graphite gas permeable plug 72 having a diameter approximating that of the interior diameter of the cylinder 70 is positioned within the cylinder 70 and rested upon the end of the sixth tube 64. The end of the sixth tube 64 has slits 74 on the exterior surface thereof to allow escape of the gases transmitted thereby into the interior of the crucible 24. The precursor materials 76, e.g., alumino-silicates, are placed within the cylinder 70 on top of the graphite gas permeable plug 72. This allows an even distribution of the inlet gas from the sixth tube 64 through the precursor material 76 within the cylinder 70. Unless otherwise noted, a general procedure, outlined below, was used for the experiments conducted.

1. Weighed precursor powders were placed within a sintered alumina liner within the graphite crucible.
2. A flow rate of about 80 cc/min of argon was passed around the outside of the crucible to prevent oxidation.
3. A flow rate of about 150 to about 1400 cc/min of argon was passed inside the graphite crucible containing the precursor powders.
4. Induction furnace was turned on at 2 kW power and increased to 4 kW.
5. At about 800° C., methane (or natural gas) or propane was passed inside the graphite crucible with argon as a carrier gas. Flow rate was determined by calculating the volume of methane or propane needed to convert the precursor powder. Twice the theoretical volume of methane or propane gas needed for conversion was passed to ensure complete conversion.
6. Methane or propane was shut off. Argon flow into the graphite crucible was maintained.
7. Precursor powder was held at a set temperature of synthesis for one hour (or longer) before shutting the induction furnace off. The materials were left in furnace until they reached room temperature and were removed.

A large number of experiments were performed to test the proof of the concept of synthesizing $Al_2O_3$—SiC composite powders using hydrocarbons as the source of carbon and alumino-silicate minerals. Initially, the total flow rate of the gases [both carrier gas (Ar in this case) and the reductant and reactant gas $CH_4$ and propane] used were quite low, e.g., about 230 ml/min. to about 750 ml/min. The volume ratio of Ar/$CH_4$ varied from 0.25:1 to 1.8:1. The temperature used for these experiments was varied from about 1500° to about 1700° C. and the duration at the maximum temperature was about one hour in all cases. However, it is noted in all these experiments, the final products were $Al_2O_3$ and mullite (and also some carbon). It was at about 760 ml/min. total flow rate when SiC was found to form (with Ar/$CH_4$ volume ratio of about 1/4) in the system under the same experimental conditions, although the reaction was incomplete. The resulting powder contained $Al_2O_3$, mullite, SiC (very small) and excess carbon. It was at a total flow rate of about 900 ml/min. or greater when formation of SiC in the system was always encountered. However, it was at a total flow rate of about 2.3 l/min. when extensive formation of SiC in the system occurred and the best results (in terms of SiC yield) were obtained. Some of these experiments were outlined below:

Experiment #1

Sixty grams of Virginia kyanite powder (about 30 μm) were fired in Ar for about ten minutes. At this time, a mixture of Ar/$CH_4$ in the volume ratio of about 6.5/3.0 at a total flow rate of about 0.95 l/min. was passed into the system for about fifty minutes. A temperature reading of about 1202° C. was observed and the methane flow was shut off while an argon flow of about 0.65 l/min. was maintained. The temperature was raised to about 1605° C. and maintained for about one hour. X-ray and SEM tests showed the resultant product was composed of mullite with small traces of $Al_2O_3$ and SiC.

Experiment #2

Thirty-three grams of Georgia kaolinite were fired in Ar for about ten minutes. At this time, a mixture of Ar/$CH_4$ in the volume ratio of about 6.5:3.0 at a total flow rate of about 0.95 l/min. was passed into the system for about 40 minutes. A temperature reading of about 1133° C. was observed and the methane flow was shut off while an argon flow of about 0.65 l/min. was maintained. The temperature was raised to about 1603° C. and maintained for about one hour. X-ray and SEM tests showed the resultant product was composed of mullite with small traces of $Al_2O_3$ and SiC.

Experiment #3

Forty grams of Georgia kaolinite were fired to about 800° C. in Ar and a flow of methane was introduced into the system, so that methane was converted into carbon and $H_2$, i.e., pyrolyzed. The system was flushed with a mixture of $CH_4$ and Ar in an Ar/$CH_4$ volume ratio of about 1.4:0.9 at a flow rate of about 2.3 l/min. for about one hour while temperature was quickly raised from about 800 to about 1100° C. After this, the methane flow was shut-off and the Ar flow rate of about 1.4 l/min. was maintained while the temperature was quickly raised to about 1550° C. This condition was maintained for about one hour and then the power was shut-off. X-ray and SEM tests on the powder showed that most of the powder was convened to $Al_2O_3$ and SiC. Only a minor quantity of mullite was present along the edges of the specimen. The SiC phase was mostly in the form of whiskers.

Experiment #4

Thirty grams of North Carolina pyrophyllite powder (about 30 μm) were fired to about 750° C. in Ar and then a gaseous mixture of Ar and methane in the Ar/$CH_4$ volume ratio of about 1.4:0.9 was introduced into the system at a flow rate of about 2.3 l/min for about one hour. The system was flushed with this gas mixture, while the temperature was raised to about 1100° C. At this temperature, the $CH_4$ gas supply was shut-off but an Ar flow rate of about 1.4 l/min. was maintained. The temperature was then raised quickly to about 1560° C. and maintained for about one hour and then the power was shut-off. X-ray and SEM tests showed that the specimen was fully converted into $Al_2O_3$ and SiC. Almost all SiC particles were whiskers.

Experiment #5

In this experiment, thirty grams of Virginia kyanite powder (about 30 μm) were used with an Ar/$CH_4$ volume ratio of about 1.4:0.9 at a total flow rate of about 2.3 l/min. The procedure used in this experiment was the same as that used in Experiment #4, but the duration of $CH_4$ passage was shorter (about 35 min.). X-ray and SEM tests showed that the specimen was not fully converted to $Al_2O_3$ and SiC, as a large quantity of mullite remained in the system. In this experiment less amount of $CH_4$ was introduced into the system and that may be reason why full conversion was not achieved.

Experiment #6

Thirty grams of Virginia kyanite powder were fired in Ar to about 800° C. and a mixture of $Ar/CH_4$ in the volume ratio of about 1.4:0.9 was introduced. The system was heated to about 1200° C., which took about one hour. At this temperature, $CH_4$ supply was cut-off. The specimen was heated to about 1565° C. and maintained for about one hour and then power was shut-off. X-ray and SEM studies showed that most of the pellet was converted to $Al_2O_3$ and SiC, with a trace amount of mullite. Most of the SiC phase is in the form of randomly shaped nodules.

Experiment #7

Twenty five grams of North Carolina pyrophyllite powder were mixed with carbon black (random shape) at about 10 wt. % of the total carbon needed to convert pyrophyllite stoichiometrically to SiC. The powder mixture was fired in Ar to about 800° C. and a mixture of $Ar/CH_4$ in the volume ratio of about 1.4:0.9 at a flow rate of about 2.3 l/min. was introduced. The gas mixture was passed for about one hour at which a temperature of about 1207° C. was measured, after which the $CH_4$ portion of the gas flow was shut-off. The temperature was further raised to about 1562° C. while the Ar flow was continued and maintained for about one hour before power was shut off. X-ray and SEM studies showed complete conversion to $Al_2O_3$ and SiC. The amount of SiC whiskers formed was decreased substantially, containing in the range of 30–40% SiC whiskers of the total amount of SiC formed. This test was carried out to explore the possibilities of forming random shaped SiC particles and not just SiC whiskers. The shape of the SiC particles was random, nodular and some whiskers.

Experiment #8

Fifteen grams of the precursor powder mixture (including the added carbon black) used in experiment #7 were used in this experiment. The powder mixture was fired in Ar to about 800° C. and a mixture of $Ar/CH_4$ in the volume ratio of about 1.4:0.9 was introduced. A total gas flow rate of about 2.3 l/min. was maintained. The gas mixture was passed for about forty-five minutes at which a temperature of about 1113° C. was measured. At this stage, $CH_4$ flow was shut-off, while Ar flow was maintained. The temperature was further raised to about 1592° C. and maintained for about one hour. Then, the power was shut-off. X-ray and SEM tests showed the formation of SiC, $Al_2O_3$ and a small amount of mullite.

Experiment #9

Twenty-five grams of North Carolina pyrophyllite powder were fired to about 750° C. in Ar and then a gaseous mixture of Ar and propane in the volume ratio of about 1.1:0.6 was introduced into the system at a total flow rate of about 1.7 l/min. The system was flushed with this gas mixture, while the temperature was raised to about 1300° C. which took about 90 minutes. At this temperature, the $CH_4$ gas supply was shut-off but an Ar flow of about 1.4 l/min. was continued and the temperature was raised quickly to about 1575° C. and maintained for about one hour. The power was then shut-off. X-ray and SEM tests showed that the specimen was composed of $Al_2O_3$, SiC (whiskers) and a small amount of mullite.

A summary of these results is given in the following table.

| Exp't No. | Powder — Weight (grams) | $CH_4$ Flow Rate (chamber) (l/min) | Air Flow Rate (chamber) (l/min) | Time Duration (min.) | Temp. of Synthesis (°C.) — Time Duration (min.) | Ar Flow Rate After Shutting $CH_4$ (chamber) (l/min.) | X-ray Diffract. Results[a] |
|---|---|---|---|---|---|---|---|
| 1 | Kyanite — 60 | 0.65 | 0.30 | 50 | 1605 — 60 | 0.30 | mullite (SiC) & ($Al_2O_3$) |
| 2 | Kaolin — 33 | 0.65 | 0.30 | 40 | 1603 — 60 | 0.35 | mullite, (SiC) & ($Al_2O_3$) |
| 3 | Kaolin — 40 | 0.90 | 1.4 | 60 | 1550 — 60 | 1.4 | (mullite), SiC & $Al_2O_3$ |
| 4 | Pyrophyllite — 30 | 0.90 | 1.4 | 60 | 1560 — 60 | 1.4 | SiC & $Al_2O_3$ |
| 5 | Kyanite — 30 | 0.90 | 1.4 | 35 | 1560 — 60 | 1.4 | mullite, SiC & $Al_2O_3$ |
| 6 | Kyanite — 30 | 0.90 | 1.4 | 60 | 1565 — 60 | 1.4 | (mullite), SiC & $Al_2O_3$ |
| 7 | Pyrophyllite + 10% C — 25 | 0.90 | 1.4 | 60 | 1562 — 60 | 1.4 | SiC & $Al_2O_3$ |
| 8 | Pyrophyllite + 10% C — 15 | 0.90 | 1.4 | 45 | 1592 — 60 | 1.4 | (mullite), SiC & $Al_2O_3$ |
| 9 | Pyrophyllite — 25 | 0.6 (Propane used instead of $CH_4$) | 1.1 | 90 | 1575 — 60 | 1.1 | (mullite), SiC & $Al_2O_3$ |

[a]( ) denotes present in trace or small amounts.

Natural alumino-silicates such as kaolinite, kyanite and pyrophyllite were investigated in these experiments. Parameters such as methane or propane flow, argon flow, synthesis temperature and time duration at temperature of synthesis were adjusted to obtain the desired products. The experimental results obtained provide the proof that carbon deposited from the sooting as the result of pyrolysis of a gaseous carbon source, e.g., methane, propane and natural gas, at temperatures above 800° C. can be used to reduce alumino-silicates and to form $Al_2O_3$—SiC composite powders. The deposition of carbon from the gaseous carbon source in the precursor pellets appears to be dependent on flow rate of the gaseous carbon source and the temperature at which the gases are introduced. For example, a higher flow rate will introduce more carbon into the system.

It was observed that $CH_4$ or natural gas is preferably introduced at a temperature below 1200° C., at which temperature the gas(es) was cracked (pyrolyzed) to carbon and gaseous species. The temperature of the system is then preferably raised to the reaction temperature which was normally at least 1450° C. Introduction of the hydrocarbon at the reaction temperature in the batch reactor used in the experiment caused too much sooting and plugged-up the gas inlets.

It should be realized that the batch reactor used to demonstrate the synthesis of SiC—$Al_2O_3$ composite is not an ideal piece of equipment to obtain a very homogeneously mixed powder throughout the specimen chamber. Near and surrounding the alumina tube, through which $CH_4$ and Ar were introduced, the reaction between alumino-silicate and carbon was complete forming $\alpha$-$Al_2O_3$ and $\beta$-SiC. However, further away from the gas inlet tube the conversion of $SiO_2$ to SiC was not complete, as carbon deposition further away from the inlet tube was not sufficiently significant resulting in incomplete conversion to SiC. In a rotary kiln or a fluidized bed reactor, of course, this type of inhomogeneous distribution of carbon will be easily overcome because of continuous mixing. This is in spite of the fact that localized sooting may occur.

Another important finding was that, if the alumino-silicate precursor(s) are sintered into large lumps without any carbon in the lumps, the reaction between the alumino-silicate and carbon (and/or CO) is slow. So, it is preferable that the alumino-silicate(s) and carbon are mixed or in good contact, before the precursor powder(s) reach the reaction temperature.

It has been found that addition of zircon ($ZrSiO_4$) into the system (along with the alumino-silicate(s)) resulted in the formation of both $ZrO_2$ and ZrC, if heated from about 1500° to about 1550° C. for about one hour. When heated to higher temperatures, the primary products of reaction between carbon and zircon are ZrC and SiC. If desired, a subsequent heat treatment in air (or in $O_2$) below 1000° C. may be performed to convert all or part of the ZrC into $ZrO_2$.

It has also been noted that clay, carbon and $TiO_2$ always produced $\alpha$-$Al_2O_3$, $\beta$-SiC and TiC, which is a very useful composite powder. However, invariably it was found in SEM pictures that a large number of SiC particles were spherical in shape.

It is understood. that the disclosed batch reactor is merely illustrative of the types useful in the present invention. Though batch reactors are useful herein, continuous reactors such as rotary kiln-type reactors and fluidized bed reactors are preferred.

It will be apparent from the foregoing that many other variations and modifications may be made in the methods and the compositions hereinbefore described by those having experience in this technology, without departing from the concept of the present invention. Accordingly, it should be clearly understood that the methods and the compositions referred to herein in the foregoing description are illustrative only and are not intended to have any limitations on the scope of the invention. The true spirit and scope of the invention is to be limited only by the following claims.

What is claimed is:

1. A process for making alumina-SiC composite ceramic powder, the process comprising:

introducing at least one pyrolyzable carbon source into a reactor containing an alumino-silicate;

pyrolyzing the at least one pyrolyzable carbon source to form carbon particles in situ, wherein the carbon particles are capable of reacting with a silicate in the alumino-silicate to form carbide products; and reacting the silicate and the carbon particles at an effective temperature for a sufficient time to transform the alumino-silicate and the carbon particles in situ into the composite ceramic powder having $Al_2O_3$ and SiC as major phases.

2. A process according to claim 1, further comprising heating the alumino-silicate prior to introducing the at least one pyrolyzable carbon source, wherein the alumino-silicate is heated to an effective temperature for a sufficient time to eliminate water contained therein.

3. A process according to claim 2, wherein the effective temperature of the heating step is at least 750° C.

4. A process according to claim 1, further comprising adding a morphologically controlled carbon powder having a size and shape to the alumino-silicate prior to introducing the at least one pyrolyzable carbon source.

5. A process according to claim 1, wherein the pyrolyzing step is completed prior to commencing the reaction step.

6. A process according to claim 1, wherein the alumino-silicate is a natural alumino-silicate.

7. A process according to claim 1, wherein the alumino-silicate is selected from the group consisting of clays, mullite, kyanite, sillimanite, pyrophyllite, and mixtures thereof.

8. A process according to claim 1, wherein the alumino-silicate is a kaolinitic clay.

9. A process according to claim 1, wherein the alumino-silicate is a synthetic alumino-silicate.

10. A process according to claim 1, further comprising adding silicates of zirconium to the alumino-silicate prior to introducing the at least one pyrolyzable carbon source.

11. A process according to claim 1, further comprising adding a material selected from the group consisting of alumina, silica, and mixtures thereof to the alumino-silicate prior to introducing the at least one pyrolyzable carbon source.

12. A process according to claim 1, wherein the at least one pyrolyzable carbon source is gaseous when introduced into the reactor.

13. A process according to claim 12, wherein the at least one pyrolyzable carbon source is a carbon-containing compound having from one to about nine carbon atoms.

14. A process according to claim 12, wherein the at least one pyrolyzable carbon source is selected from the group consisting of hydrocarbons having one to about nine carbon atoms.

15. A process according to claim 1, wherein the at least one pyrolyzable carbon source is selected from the group consisting of natural gas, methane, ethane, propane, butane, pentane, hexane, heptane, octane, nonane, ethylene, propylene, acetylene, benzene, toluene, cyclopropane, cyclobutane, cyclopentane, cyclohexane, ethanol, propanol, and combinations thereof.

16. A process according to claim 1, wherein the reaction step is at a reaction temperature ranging from about 1450° C. to about 1850° C.

17. A process according to claim 16, wherein the pyrolyzing step is at a pyrolyzing temperature below the reaction temperature.

18. A process according to claim 1, wherein the pyrolyzing step and reaction step are performed concurrently.

* * * * *